Patented Nov. 21, 1933                                                              1,935,809

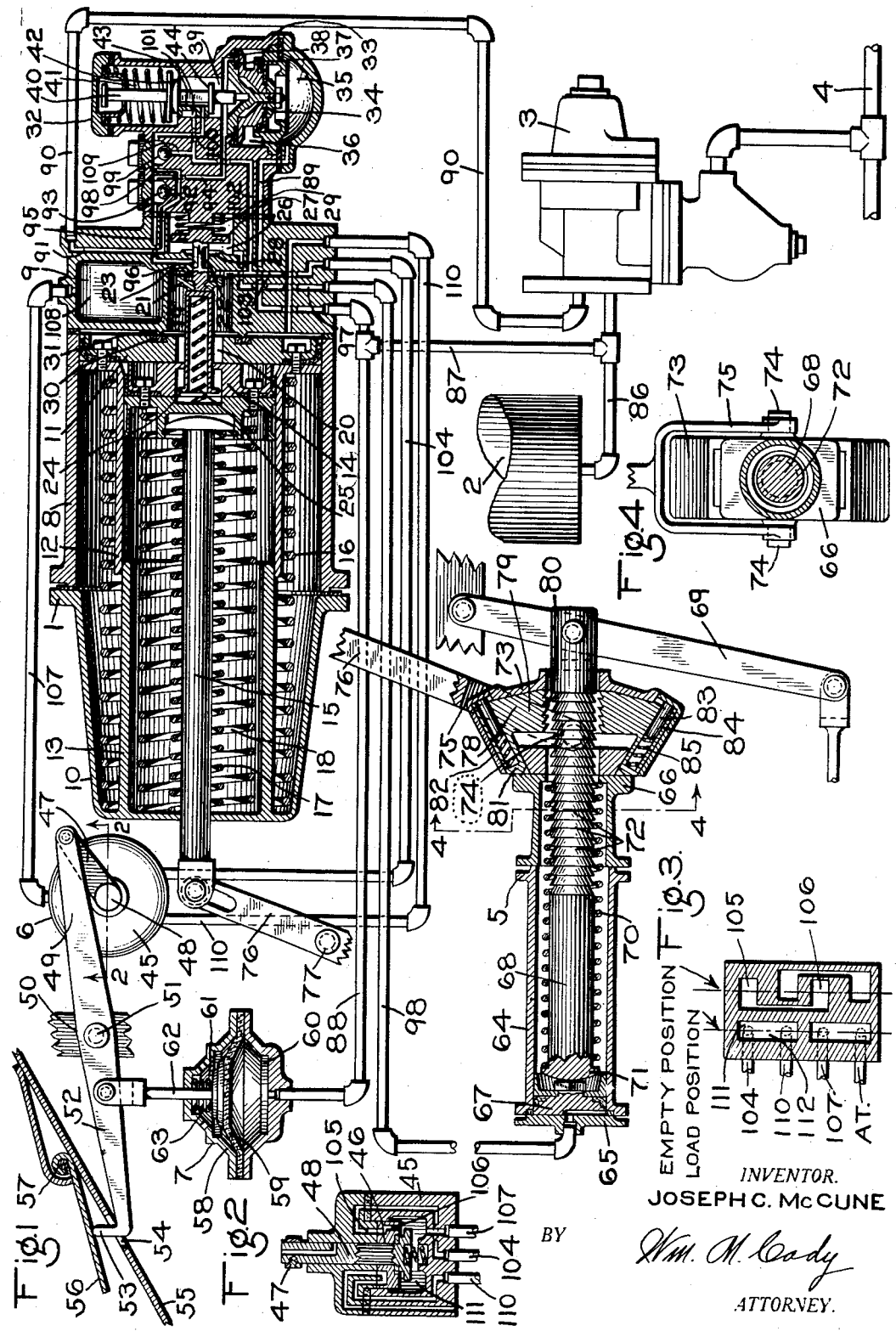

UNITED STATES PATENT OFFICE 1,935,809

EMPTY AND LOAD BRAKE

Joseph C. McCune, Edgewood, Pa., assignor to The Westinghouse Air Brake Company, Wilmerding, Pa., a corporation of Pennsylvania Application April 10, 1931. Serial No. 529,011

13 Claims. (Cl. 303—23)

This invention relates to fluid pressure brakes and has particular relation to mechanism for applying the brakes with different pressures according to whether the car is empty or loaded.

One object of the present invention is to provide an empty load brake equipment having a slack take-up device which operates to take up the slack in the brake rigging before the brakes are applied by either the empty brake cylinder or the load brake cylinder and in which the empty and load brake cylinders are not operatively connected to the brake rigging until the empty brake cylinder piston moves.

Another object of this invention is to provide a novel and improved empty and load brake cylinder device which is compact in construction and which is automatically conditioned to apply the brakes with the desired pressure according to whether the car is empty or loaded.

Other objects will appear from the following description and appended claims.

In the accompanying drawing; Fig. 1 is a diagrammatic view, partly in elevation and partly in section, of an "empty-load" brake equipment constructed in accordance with my invention; Fig. 2 is a section through the change-over valve device taken on line 2—2 of Fig. 1; Fig. 3 is a sectional development view of the change-over valve device; and Fig. 4 is a sectional view of the slack take-up mechanism taken on line 4—4 of Fig. 1.

Referring to the drawing, a fluid pressure brake equipment constructed in accordance with my invention is shown as comprising in general, an empty and load fluid pressure brake device 1; an auxiliary reservoir 2; a triple valve device 3 for controlling communication between a brake pipe 4 and the auxiliary reservoir 2 and between the auxiliary reservoir and the brake device 1; a slack take-up mechanism 5; a change-over valve device 6 for controlling the operation of the empty-load brake device 1; and a fluid pressure responsive device 7 for operating the change-over valve device.

The empty-load fluid pressure brake device 1 preferably embodies a fluid pressure load cylinder 8 closed at opposite ends by a pressure cylinder head 9 and a non-pressure cylinder head 10. A load piston 11 is mounted for reciprocation within the cylinder 8 and carries an "empty" cylinder 12 which telescopically engages a cylindrical concentrically arranged guiding member 13 carried by the non-pressure cylinder head 10. A piston 14 is mounted within the inner or empty cylinder 12 and carries a piston rod 15 which projects through the non-pressure cylinder head 10 for operative engagement with the brake equipment hereinafter to be described. The piston 11 is urged inwardly by a coil spring 16 which surrounds the cylinder 12 and the cylindrical guiding member 13 between the piston 11 and the cylinder head 10. Similarly, the piston 14 is urged inwardly by concentrically arranged coil springs 17 and 18 which surround the piston rod 15 between the cylinder head 10 and the piston 14.

The pressure cylinder head 9 is provided with a recess 19 which communicates with the cylinder 12 back of the piston 14 through an axially disposed opening 20 in the piston 11 and contains a check valve 21, the purpose of which will hereinafter be described. The valve 21 is carried by a stem 22 and is normally urged into engagement with a seat rib 23 by a hollow plunger 24 which is slidably mounted on the piston 14 and which houses a coil spring 25. A valve chamber 26 is also provided in the pressure head 9 and contains a check valve 27 which is carried by the stem 22 and which is urged into seating engagement with a seat rib 28 by a coil spring 29. As shown in Fig. 1 of the drawing, when the piston 14 occupies its innermost position, the plunger 24 holds the check valve 21 closed and check valve 27 unseated against the action of the spring 29. Also, when the piston 11 occupies its innermost position, communication between the recess 19 and the cylinder 8 back of the piston 11 is interrupted by a seat 30 which is carried by the piston 11 for engagement with an annular seat rib 31 which is formed on the pressure head 9 and which surrounds the recess 19.

Associated with the empty load device 1 is a transfer valve device 32 comprising a casing 33 which is mounted on the pressure head 9 and which contains a piston 34, forming a chamber 35 on one side and a chamber 36 on the other side thereof. Located within the chamber 36 and carried by the piston 34 is a poppet valve 37 which is adapted to engage an annular seat rib 38 to control communication between the chamber 36 and a slide valve chamber 39. The piston 34 and valve 37 are mounted to move in unison and carry a stem 40, which is urged downwardly by a spring 41 which surrounds the stem between a collar 42 carried thereby and the end wall of the casing 33. This stem operates a slide valve 43 which is disposed between the collar 42 and a collar 44 also carried by the stem 40.

The change-over valve device 6 which selectively controls operation of the "load" piston 11 and the "empty" piston 14, comprises a casing 45 in which a valve member 46 is rotatably mounted. An arm 47 is fixed to the stem 48 of the valve member 46 and is pivotally connected to an arm 49 of a lever 50 which is pivotally mounted intermediate of its length on the frame of the car, as indicated at 51. The other arm 52 of the lever 50 is formed with an extension 53 which projects upwardly through an opening 54 provided in the bottom 55 of the car for engagement by a plate 56 which is hinged at 57 to the bottom 55 of the car.

When the car is empty, the parts are yieldably maintained in the positions shown in Fig. 1 by means of the pressure responsive device 7. This device comprises a casing 58 containing a flexible diaphragm 59 which divides the interior of the casing into a pressure chamber 60 and an atmospheric chamber 61. The diaphragm 59 carries a stem 62 which is pivotally connected to the arm 52 of the lever 50 and holds the change-over valve 6 in the position shown in Fig. 2, when the car is empty, by fluid under pressure admitted to the pressure chamber 60. A spring 63 surrounds the stem 62 between the diaphragm 59 and the casing 58 and tends to urge the diaphragm 59 outwardly.

The slack take-up device 5 is herein shown as comprising a cylinder 64 which is closed at one end by a pressure head 65 and which is provided at its other end with a non-pressure head 66. A piston 67 is mounted in the cylinder 64 for abutting engagement with a push rod 68 which extends through the non-pressure head 66 and is pivotally connected at its outer end with a lever 69 of the brake rigging. The push rod 68 is urged inwardly by a coil spring 70 which surrounds the push rod between an annular shoulder 71 provided on the inner end of the push rod and the non-pressure head 66 and is provided with a series of uniformly spaced annular ratchet teeth 27 throughout a portion of its length. Movably mounted on the push rod 68 exteriorly of the cylinder 64 is a latch box 73 which is provided with trunnions 74 for engagement by the bifurcated end 75 of a lever 76 which is pivotally mounted on the car frame intermediate of its length, as indicated at 77 and which is pivotally connected at its other end with the outer end of the piston rod 15 of the empty-load device 1.

Slidably mounted within the latch box 73 is a plurality of locking jaw members 78 provided with inwardly extending portions 79 formed with serrated faces 80 for engagement with the teeth 72 of the push rod 68. The jaw members 78 are also provided with rearwardly inclined portions 81 which are slidably mounted in correspondingly inclined recesses 82 formed in the latch box 73 and which are adapted to engage the non-pressure head 66. Plungers 83 are mounted in bores 84 formed in the portions 81 of the jaw members 78 and are urged into yieldable engagement with the inner surface of the latch box 73 by springs 85. When the latch box 73 occupies the position shown in Fig. 1, the locking jaws 78 are held out of engagement with the push rod 68 against the action of the springs 85. If, however, the latch box 73 is moved outwardly, or to the right, as viewed in the drawing, the plungers 83 and springs 85 tend to hold the jaws 78 against longitudinal movement during the initial movement of the latch box, but permit them to move radially inwardly until the serrated surfaces 80 thereof interlock with the teeth 72 of the push rod 68, so that the continued movement of the latch box 73 is transmitted to the push rod.

When the car is empty, the plate 56 is held in its elevated position and the change-over valve 6 is held in its empty position (illustrated in Figures 1 and 2 of the drawing) by fluid under pressure which is admitted to the pressure chamber 60 of the fluid pressure responsive device 7 directly from the auxiliary reservoir 2 through pipes 86, 87 and 88. Also, when the car is empty, the abutment 34 of the transfer valve device is normally held in its inner position, shown in Fig. 1, by fluid under pressure which is admitted to the chamber 35 of the transfer valve device 32 directly from the auxiliary reservoir 2, through the pipes 86, 87 and 88 and a passage 89 provided in the pressure head 9 and casing 33 of the transfer valve device 32.

With the parts of the apparatus in the positions shown in Fig. 1 and as above described for empty car braking, in order to effect an application of the brakes, the triple valve 3 operates in the well known manner to supply fluid under pressure from the auxiliary reservoir 2, to the pipe. 90. From pipe 90, fluid flows through passages 91 and 92 in pressure head 9, past a ball check valve 93 and through a passage 94 to the chamber 39 in the transfer valve device 32. After passing the ball check valve 93, fluid under pressure also flows through a passage 95, cavity 96 in valve stem 22 to the chamber 26 and thence through a passage 97 and a pipe 98 to the cylinder 64 of the slack take-up device 5. Fluid under pressure thus admitted to the cylinder 64 forces the piston 67 and the push rod 68 outwardly until the brake shoes are carried into engagement with the wheels of the car, thus taking up the slack in the brake rigging. The flow of fluid under pressure to the cylinder 64 of the slack take-up device 5 causes a slight reduction in pressure in the auxiliary reservoir and in the chamber 35 of the transfer valve device 32 and as soon as the pressure of the fluid in this chamber reaches a point where it is over-balanced by the pressure of the fluid admitted to the chamber 39, plus the pressure exerted by the spring 41, the check valve 37 and piston 34 move outwardly, thus shifting the slide valve 43 to another position. The shifting of the slide valve 43 causes the movement of the empty piston 14 by fluid under pressure, which flows from the passage 91, through a passage 98 communicating therewith, over a check valve 99, through a passage 100, cavity 101 in the slide valve 43, passages 102 and 103 to the recess 19 from which it flows through the opening 20 in the piston 11 to the cylinder 12 at the right or pressure side of the brake cylinder piston 14. At the same time, fluid under pressure flows from the passage 103, through a pipe 104 to a passage 105 in the change-over valve device 6 which, in the empty car position, registers with a port 106 in the rotary valve 46. Port 106 opens into valve chamber 111 and pipe 107 is connected to said chamber, so that fluid under pressure flows to pipe 107 and thence to a volume reservoir 108 formed in the pressure head 9.

With the present construction, the auxiliary reservoir volume is such as to provide the desired brake cylinder pressure for the load brake cylinder, but since the same auxiliary reservoir is employed for the empty brake cylinder, the volume reservoir 108 is provided, which is connected to the empty brake cylinder 12 when the load brake cylinder is cut out and which is of such volume that the auxiliary reservoir will equalize into the combined volumes of the empty brake cylinder and the volume reservoir at substantially the same pressure as the auxiliary reservoir equalizes into the load brake cylinder.

As soon as the empty piston 14 has carried the plunger 24 out of engagement with the check valve 21, the spring 29 closes the check valve 27, thereby interrupting the supply of fluid under pressure to the cylinder 64 of the slack take-up device 5. During this initial movement of the piston 14, the latch box 73 is moved to the right, as viewed in the drawing, which permits the locking jaws 78 to move radially inward under the action of the springs 85 and plungers 83 until the serrated faces 80 interlock with the teeth 72 on the push rod 68 in its slack take-up position in the manner hereinbefore described. Continued movement of the piston 14 will exert the desired braking pressure on the wheels of the empty car.

The opening of the check valve 21, hereinabove described, establishes communication between the passage 95 and the recess 19, thus not only providing a more direct path for the flow of fluid under pressure to the empty cylinder 12, but also connecting the chamber 39 of the transfer valve device 32 with the empty cylinder 12. This causes a quick reduction in the pressure in chamber 39, which permits the valve 37 to close and return the slide valve 43 to its initial position.

If it is desired to release the brakes after an empty application, as hereinabove described, the pressure in the brake pipe 4 is increased, which causes the triple valve device 3 to establish communication between the brake pipe and the auxiliary reservoir 2 and between the pipe 90 and atmosphere in the usual manner. This first permits the fluid under pressure to escape from the empty brake cylinder 12 and the volume reservoir 108 through the passages 103, 102 and 109, and thence past the exhaust check valve 99 to the passages 98 and 91 and pipe 90. The reduction in pressure in the cylinder 12 permits the springs 17 and 18 to return the empty piston 14 to its initial position and thereby release the brakes. Just before the piston 14 completes its return movement, the plunger 24 carried thereby engages the check valve 21 and thus first unseating the check valve 27 and then seating the valve 21. The opening of the check valve 27 establishes communication between the slack take-up cylinder 64 and the pipe 90, thus permitting the fluid under pressure that, up to this time has been trapped in the cylinder 64, to escape to atmosphere. This permits the spring 70 to return the push rod 68 and the brakes operated thereby to their full release position. It will be noted in this connection, that the brake applying pressure in the cylinder 14 is reduced before the latch box mechanism releases its grip on the push rod 68, for the reason that if the pressure in the cylinder 64 is released prior to or simultaneously with the release of the fluid under pressure from the empty cylinder 12, the latch box mechanism would be released and permit the energy stored in the brakes and brake rigging to be also released suddenly with undesired clashing and possible injury to the apparatus.

When the car is loaded, the plate 56 is depressed by the weight of the material loaded in the car and swings the change-over valve device 6 to the position shown in the left hand portion of Fig. 3 of the drawing, against the action of the fluid pressure responsive device 7. Under these conditions, if it is desired to apply the brakes, the brake pipe pressure is reduced as before, which causes the triple valve device 3 to operate in its usual manner. This causes the slack take-up mechanism to function as previously described, but in this case the change-over valve interrupts communication between the pipe 104 and the volume reservoir 108 and establishes communication between the pipe 104 and a pipe 110 through registering passages 111 and 112. As a result, fluid under pressure thus admitted to the pipe 110 flows through a passage 113 to the "load" cylinder 8 back of the piston 11 and forces this piston, together with the cylinder 12 carried thereby and the empty piston 14, outwardly and causes an application of the brakes under load conditions. The operation of the apparatus in other respects is exactly the same as that hereinabove described in connection with the application of the brakes when the car is empty.

It will be noted that the brake lever 76 is operatively disconnected from the brake rigging during the operation of the take-up piston 67 and that said brake lever is only moved when the empty brake cylinder piston 14 is moved and consequently excessive movement of the lever with consequent extreme angular positioning is avoided. This permits the use of any desired lever ratio, since movement of the lever 76 is only that due to the movement of either the empty cylinder piston 14 or the load piston 11.

It is also to be noted that in some cases there is only a limited space available on the car for the installation of the brake cylinder lever and consequently, the extent of movement of the brake lever must be limited. With my improvement, since the brake lever is operatively disconnected from the brake rigging during the operation of the take-up piston, only a limited movement of the brake cylinder lever is required.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination of an auxiliary reservoir, a pair of concentrically arranged brake cylinders, a piston in each of said cylinders, a piston rod operated by both of said pistons, a slack take-up device having a slack take-up cylinder, a slack take-up piston in said slack take-up cylinder, a push rod operated by said slack take-up piston having an operative connection with said piston rod, and valve mechanism controlled by the brake cylinder pistons for controlling the supply of fluid under pressure from said auxiliary reservoir to said slack take-up cylinder.

2. In a fluid pressure brake epuipment, the combination of an auxiliary reservoir, a pair of concentrically arranged brake cylinders, a piston in each of said cylinders, a piston rod operated by both of said pistons, a slack take-up device having a slack take-up cylinder, a slack take-up piston in said slack take-up cylinder, a push rod operated by said slack take-up piston having an operative connection with said piston rod, valve mechanism for selectively controlling communication between said brake cylinders and said auxiliary reservoir, and a check valve controlled by the brake cylinder pistons for controlling communication between said brake cylinders and said auxiliary reservoir jointly with said valve mechanism.

3. In a fluid pressure brake equipment, the combination of an auxiliary reservoir, a pair of concentrically arranged brake cylinders, a piston in each of said cylinders, a piston rod operated by both of said pistons, a slack take-up device having a slack take-up cylinder, a slack take-up piston in said slack take-up cylinder, a push rod operated by said slack take-up piston having an operative connection with said piston rod, valve mechanism for selectively controlling communication between said brake cylinders and said auxiliary reservoir, and a pair of check valves controlled by the brake cylinder pistons for controlling communication between said auxiliary reservoir and said brake cylinders jointly with said valve mechcanism and between said auxiliary reservoir and said slack take-up cylinder.

4. In a fluid pressure brake equipment, the combination of a first brake cylinder, a piston in said cylinder, a second brake cylinder carried by said piston in concentric relation to said first brake cylinder, a piston in said second brake cylinder, a piston rod operated by both of said pistons, a volume reservoir, and means for selectively supplying fluid under pressure to said first brake cylinder and to both said second brake cylinder and said volume reservoir.

5. In a fluid pressure brake equipment, the combination of a first brake cylinder, a piston in said cylinder, a second brake cylinder carried by said piston in concentric relation to said first brake cylinder, a piston in said second brake cylinder, a piston rod operated by both of said pistons, a volume reservoir, and a valve adapted to establish communication between a source of fluid under pressure and said first brake cylinder when said valve occupies one position and for establishing communication between said source and both said second brake cylinder and said volume reservoir when said valve occupies another position.

6. In a fluid pressure brake equipment, the combination with a brake pipe, an auxiliary reservoir, a slack take-up cylinder, a brake cylinder and a triple valve device operative upon a reduction in brake pipe pressure to establish a communication through which fluid under pressure is supplied from said auxiliary reservoir to the slack take-up cylinder, of valve means subject at all times to auxiliary reservoir pressure and operable upon an increase in pressure in said slack take-up cylinder to establish communication through which fluid under pressure is supplied from said triple valve device to said brake cylinder.

7. In a fluid pressure brake, the combination with a brake lever, a take-up cylinder, and a piston in said cylinder operatively connected to said lever, of a brake cylinder, a piston in said cylinder, an operating lever operatively connected to said brake cylinder piston, and means operative only upon movement of said brake cylinder piston for operatively connecting said operating lever to said brake lever.

8. In a fluid pressure brake, the combination with a brake lever, a take-up cylinder, and a piston in said cylinder operatively connected to said lever, of a brake cylinder, a piston in said cylinder, an operating lever operatively connected to said brake cylinder piston and normally disconnected from said brake lever, and means operative upon movement of said brake cylinder piston for operatively connecting said operating lever with said brake lever.

9. In a fluid pressure brake, the combination with a brake lever, a take-up cylinder, and a piston in said cylinder operatively connected to said lever, of a brake cylinder, a piston in said cylinder, an operating lever operatively connected to said brake cylinder piston and normally disconnected from said brake lever, and a clutch mechanism operated by the movement of said operating lever for operatively connecting said operating lever with said brake lever.

10. In a fluid pressure brake equipment, the combination with a power brake cylinder, a piston therein, a take-up brake cylinder, and a piston therein, of a valve device operative in applying the brakes to supply fluid under pressure to said brake cylinders, transfer valve means operated upon an increase in the pressure of fluid supplied to the take-up brake cylinder for opening communication through which fluid under pressure is supplied to the power brake cylinder, and valve means operated upon movement of the power brake cylinder piston for establishing a communication, independent of the transfer valve means, through which fluid under pressure is supplied to the power brake cylinder.

11. In a fluid pressure brake equipment, the combination with a power brake cylinder, a piston therein, a take-up brake cylinder, and a piston therein, of a valve device operative in applying the brakes to supply fluid under pressure to said brake cylinders, transfer valve means operated upon an increase in the pressure of fluid supplied to the take-up brake cylinder for opening communication through which fluid under pressure is supplied to the power brake cylinder, and valve means operated upon movement of the power brake cylinder piston for establishing a direct communication through which fluid under pressure is supplied to the power brake cylinder and for cutting off communication through which fluid under pressure is supplied to the take-up brake cylinder.

12. In a fluid pressure brake equipment, the combination with a power brake cylinder, a take-up brake cylinder, an auxiliary reservoir, a brake pipe, and a brake controlling valve device operated upon a reduction in brake pipe pressure for controlling the supply of fluid under pressure from the auxiliary reservoir to said brake cylinders, of a valve device subject to the opposing pressures of the auxiliary reservoir and the pressure of fluid supplied to the take-up brake cylinder for controlling communication through which fluid under pressure is supplied to the power brake cylinder.

13. In a fluid pressure brake equipment, the combination with a power brake cylinder, a take-up brake cylinder, an auxiliary reservoir, a brake pipe, and a brake controlling valve device operated upon a reduction in brake pipe pressure for controlling the supply of fluid under pressure from the auxiliary reservoir to said brake cylinders, of a valve device subject to the opposing pressures of the auxiliary reservoir and a chamber supplied with fluid at the pressure supplied to the take-up brake cylinder for controlling communication through which fluid under pressure is supplied to the power brake cylinder, and valve means operated upon movement of the power brake cylinder piston for establishing communication from the power brake cylinder to said chamber.

JOSEPH C. McCUNE.